(No Model.)
C. O. VINYARD.
NUT LOCK.
No. 469,613. Patented Feb. 23, 1892.
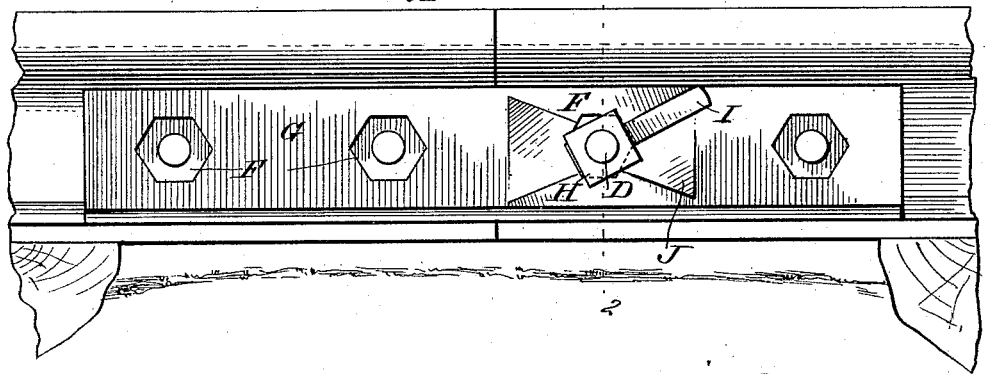
Fig. 1.
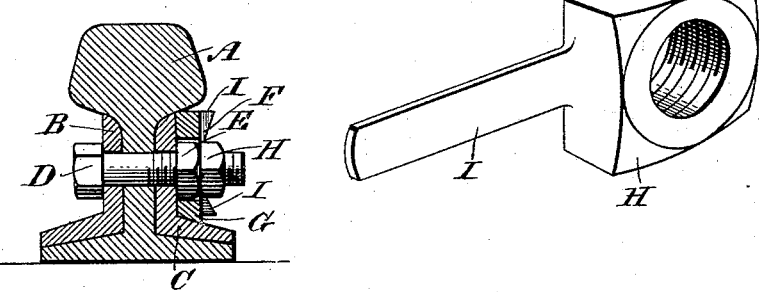
Fig. 2.
Fig. 3.
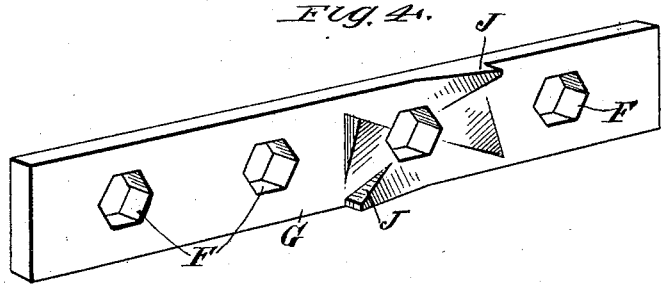
Fig. 4.
WITNESSES:
W. R. Davie
C. Sedgwick
INVENTOR:
C. O. Vinyard
BY Munn & Co
ATTORNEYS

UNITED STATES PATENT OFFICE.

CHARLES O. VINYARD, OF NAVAJO SPRINGS, ARIZONA TERRITORY.

NUT-LOCK.

SPECIFICATION forming part of Letters Patent No. 469,613, dated February 23, 1892.

Application filed June 2, 1891. Serial No. 394,842. (No model.)

*To all whom it may concern:*

Be it known that I, CHARLES O. VINYARD, of Navajo Springs, county of Apache, and Territory of Arizona, have invented a new and Improved Nut-Lock, of which the following is a full, clear, and exact description.

The invention relates to nut-locks such as shown and described in Letters Patent of the United States, No. 404,326 granted to me May 28, 1889.

The object of the present invention is to provide a new and improved nut-lock which is simple and durable in construction, designed for locking a series of adjacent bolts in place, and arranged to prevent the nuts from loosening after being screwed up to the proper place.

The invention consists of a locking-plate provided with a series of openings engaging the nuts to be locked and a nut screwing on one of the bolts and provided with an integral spring-arm adapted to engage one of a series of rigid teeth or projections formed on the locking-plate.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a front view of the improvement as applied to a rail-joint. Fig. 2 is a transverse section of the same on the line 2 2 in Fig. 1. Fig. 3 is a perspective view of the nut and its spring-arm, and Fig. 4 is a like view of the locking-plate.

As shown in the drawings, the improved nut-lock is applied to a rail-joint A, the rails being coupled together by the angle-plates B C and the bolts D. The nuts E of the said bolts D pass into openings F, formed in a locking-plate G, resting against the angle-plate C, as is plainly shown in Figs. 1 and 2. The openings F correspond to the shape of the nuts, the said locking-plate G being applied over the several nuts after the latter have been screwed up tightly against the angle-plate C to lock the rails in place in the usual manner.

On one of the bolts D screws a lock-nut H sufficiently large to abut against the front face of the locking-plate G, the said nut H being provided with a spring-arm I, formed integral with the nut and adapted to engage one of a series of teeth or projections J, formed on the face of the locking-plate G and surrounding the opening F, on which the nut H is applied. The arm I extends from one of the sides of the nut H near its inner face, as is plainly shown in Fig. 3, so that when the nut H is screwed up tightly against the face of the locking-plate G its arm I abuts against the back of one of the teeth J, thus locking the nut H in place on the locking-plate G, which latter in turn locks the several nuts E to the respective bolts D. The arm I is made of spring material, so as to readily pass over the teeth or projections J when the nut H is screwed up. It will be seen that by this means a series of nuts are securely locked in place by a single locking-plate and nut, the latter screwing on one of the bolts for fastening the parts together. It will further be seen that the several parts can be readily unfastened whenever desired, the operator then bending the spring-arm I outward to permit the arm I to pass over the teeth or projections J, so as to allow unscrewing of the nut H.

Having thus described my invention, I claim as new and desire to secure by Letters Patent—

1. A nut-lock comprising a locking-plate formed with openings adapted to engage the nuts to be locked, a series of rigid teeth formed on the face of the said locking-plate around one of the openings, and a nut adapted to screw on one of the bolts and provided with an integral spring-arm adapted to engage one of the said series of teeth, substantially as shown and described.

2. In a nut-lock, the combination, with a locking-plate provided with a series of angular openings adapted to engage the nuts to be locked and a series of rigid teeth surrounding one of the said openings and formed integral with the said locking-plate, of a nut adapted to screw on one of the bolts, and a spring-arm formed integral with the said nut and adapted to engage one of the said series of teeth, substantially as shown and described.

CHARLES O. VINYARD.

Witnesses:
HUGH LYNCH,
W. T. GRIFFIN.